Figure 2:
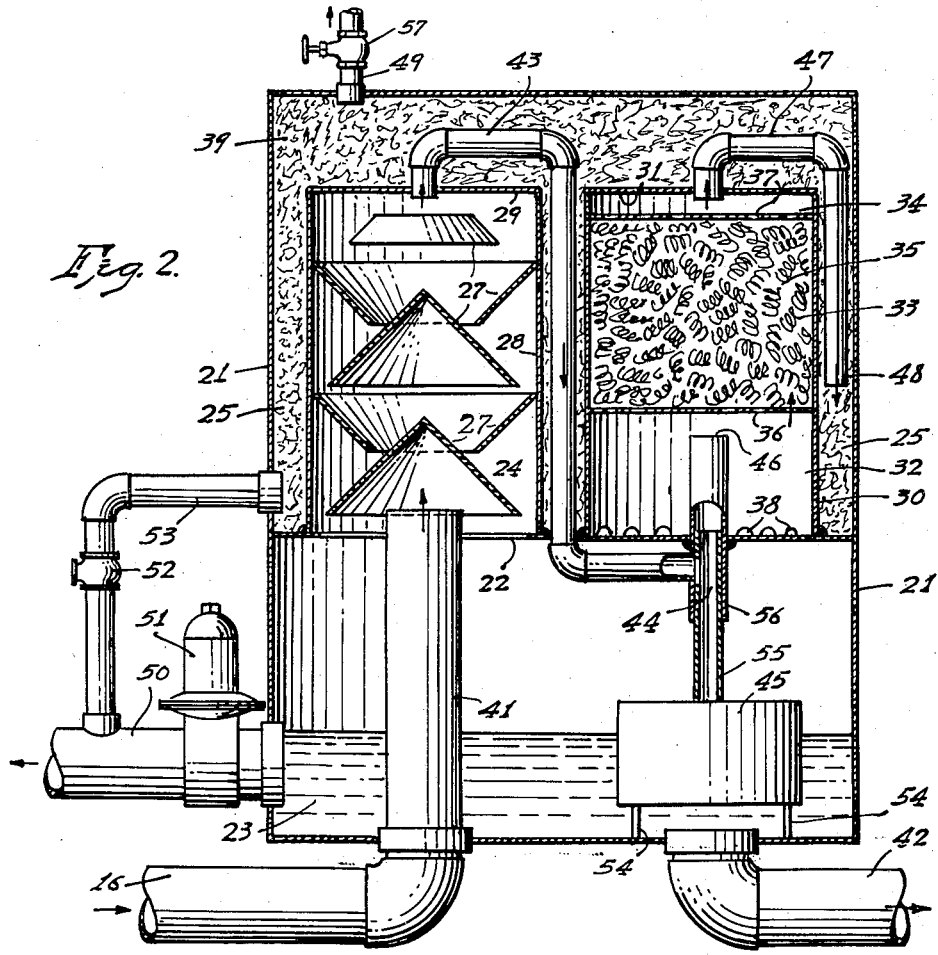

April 1, 1958 H. H. WRIGHT 2,828,818
METHOD AND APPARATUS FOR SEPARATION OF GAS FROM OIL
Filed June 8, 1954 2 Sheets-Sheet 1

INVENTOR.
Harold H. Wright
BY
ATTORNEYS

April 1, 1958  H. H. WRIGHT  2,828,818
METHOD AND APPARATUS FOR SEPARATION OF GAS FROM OIL
Filed June 8, 1954  2 Sheets-Sheet 2
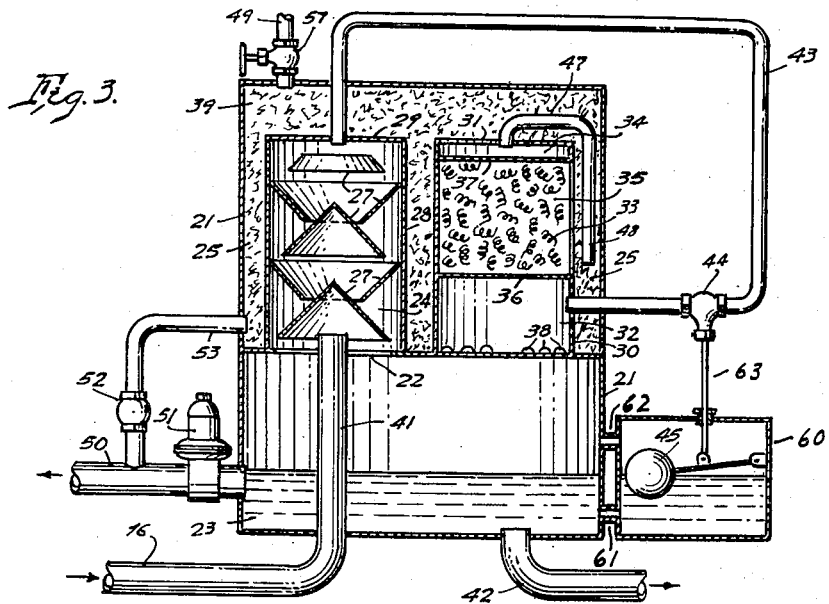
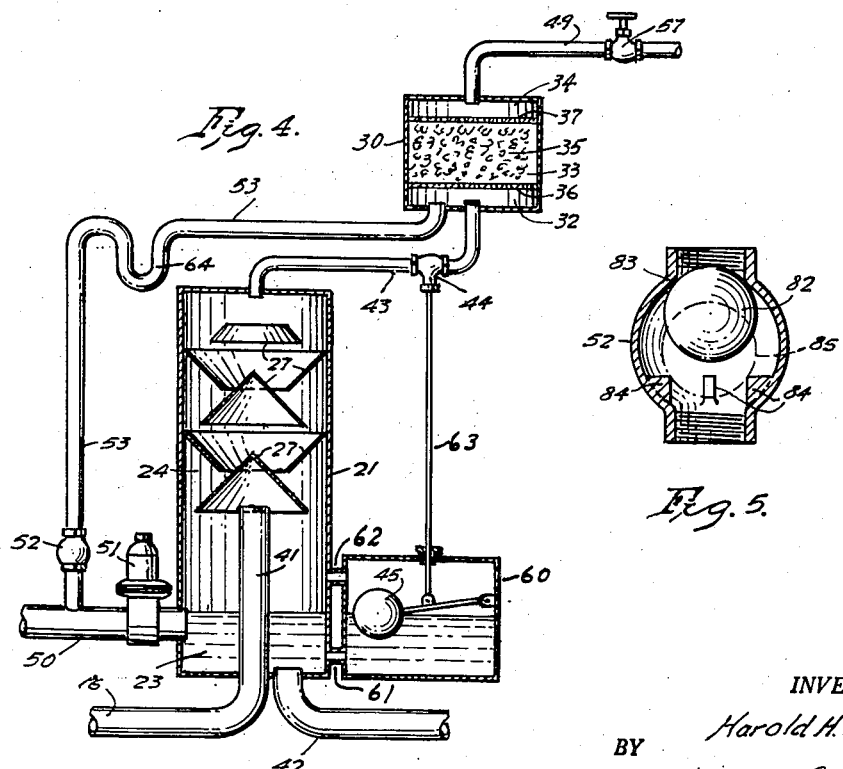
INVENTOR.
Harold H. Wright
BY
ATTORNEYS

United States Patent Office 2,828,818
Patented Apr. 1, 1958

2,828,818

METHOD AND APPARATUS FOR SEPARATION OF GAS FROM OIL

Harold H. Wright, Tulsa, Okla., assignor to Gulf Oil Corporation, Pittsburgh, Pa., a corporation of Pennsylvania Application June 8, 1954, Serial No. 435,141

4 Claims. (Cl. 166—8)

This invention relates to method and apparatus for separation of gas from oil, and more particularly to a method and apparatus in which a stream of oil and gas from an oil well is introduced into a closed chamber under conditions conducive to separation of gas from oil, in which the separated oil is discharged, in which the separated gas is passed through a precipitating zone for condensation and precipitation of condensible vapors and mist, and in which the residual gas is discharged from the system and the precipitated hydrocarbons from the precipitating zone are returned to the annular space between the casing and tubing of the well.

In the production of oil from oil wells the oil is ordinarily accompanied by hydrocarbon gas and water. It is essential that the gas be separated from the liquid at an early stage of its handling, because it would otherwise interfere with the pumping of the liquid, and for this reason it is customary to pass the stream from the well through a gas separator at a point relatively near the well and at a pressure not exceeding that of its emergence therefrom.

Gas separators are of two main types. One type is used for separating a flow of oil from a very substantial accompaniment of gas, and in that type the discharge of gas is continuous and the discharge of oil is intermittent. The second type of gas separator, to which the present invention belongs, is used for separating a minor amount of gas from a major flow of oil. In this type of gas separator the discharge of oil is continuous and the discharge of gas may be intermittent. In actual use, if the operation of the well is fairly uniform, the gas separator often attains a condition of equilibrium in which there is continuous discharge of oil and continuous discharge of gas.

One object of my present invention is to separate gas from oil in a stream discharged from an oil well.

Another object of my invention is to recover condensible vapors and mist from the separated gas, in the form of liquid, and return this material from the relatively low pressure precipitating chamber to the higher pressure oil stream without the interposition of additional pumping equipment.

Another object of my invention is to operate the gas separator in conjunction with the well which it services, in such a manner that the well can be used to store an accumulation of separated gas, particularly to store separated gas in such quantity as may be needed to start operation of the well again after it has been shut down.

Figure 1:
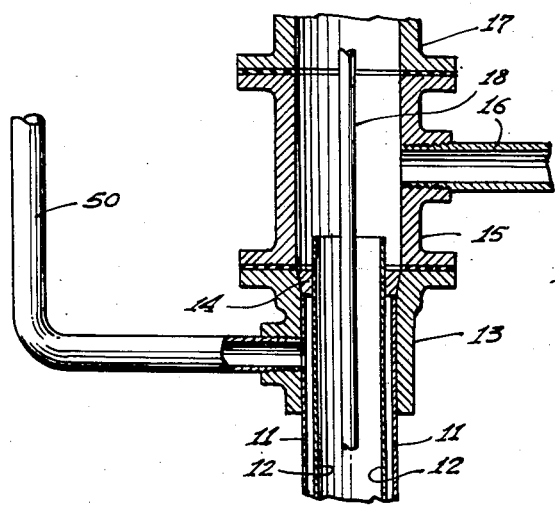

In the accompanying drawings, Figure 1 illustrates the pertinent parts of an oil well, with which my separator is intended to be used. Figure 2 is a vertical section of the gas separator, this figure showing a liquid-gas separating chamber, demisting chambers, and a float operated valve all within one enclosing shell. Figure 3 illustrates an embodiment of my invention similar to that shown in Figure 2 except that the float containing chamber is mounted exteriorly of the main enclosing shell 21. Figure 4 illustrates yet another embodiment of my invention, this one comprising a columnar liquid-gas separating chamber, a gas demisting chamber and a float containing chamber, these three being separate, communicating and coacting elements of the unitary device. Figure 5 shows the internal construction of valve 52.

Referring to Figure 1 of the accompanying drawings, 11 indicates the steel casing of an oil well and 12 indicates the tubing of such well. The casing 11 terminates in a casing head 13, and the space between the casing 11 and the tubing 12 is closed off at the top of the casing head by ring 14. The well tubing 12 terminates in a tubing head 15 and a conduit 16 conducts oil and gas from the tubing head 15 to the gas separator. Surmounting the tubing head is a fitting 17, not shown in full detail, which closes off the top of the well and is provided with a stuffing box, not shown, to permit the gas and liquid-tight passage therethrough of polish rod 18 which carries a well pump on its lower extremity.

Referring to Figure 2 of the accompanying drawings, which shows one specific embodiment of my invention, the enclosing shell of the gas separator is shown at 21. A plate 22 separates the liquid receiving chamber 23 in the lower portion of shell 21 from a gas separating zone 24 and a mist precipitating chamber 25 in the upper part of shell 21. This plate 22 is cut away at the base of separating zone 24 to provide open communication between separating zone 24 and receiving chamber 23. The gas separating zone 24, open at the bottom, as just mentioned, is surrounded by side walls 28 and top 29, and it is fitted with a plurality of baffles 27.

The mist precipitating chamber 25, which includes all of the device above plate 22 except gas separating zone 24, comprises several parts. Side walls 30, top 31 and bottom plate 22 enclose a primary precipitating zone which includes drainage chamber 32, packed chamber 33, and head 34. A packing 35 is positioned between gratings 36 and 37. Drainage holes 38 permit passage of precipitated liquid from drainage chamber 32 through walls 30 into the bottom of the surrounding secondary precipitating zone 39. All the remainder of the device above plate 22 and outside the walls 28 and 30 is the secondary precipitating zone 39 and connecting lines. This secondary precipitating zone, like the primary precipitating zone, is packed with permeable material.

A lead line or conduit 16 connects from the tubing head 15 to the gas separating device and constitutes a gas and oil inlet line to such device. This line 16 terminates in a section 41 positioned to direct the unseparated incoming stream of gas and oil into the gas separating zone 24 and against baffles 27. A conduit 42 for removing separated oil is connected to the liquid receiving chamber at a low point thereof. Separated gas and vapors, together with mist, are conducted through conduit 43, past valve 44, controlled by float 45, into drainage chamber 32 through opening 46. A conduit 47 extends from the head 34 of the primary precipitating zone into the secondary precipitating zone 39 at a point 48 remote from the gas discharge connection 49.

A return conduit 50 extends from a low portion of liquid receiving chamber 23 back to casing head 13 and this return conduit 50 carries a pressure-operated relief valve 51. A conduit 53 carrying valve 52 extends downwardly from a low point in the secondary precipitating zone 39 to return conduit 50, entering that conduit at a point between pressure-operated relief valve 51 and casing head 13. Conduit 53 advantageously departs from secondary precipitating zone 39 at a point just high enough above plate 22 to provide an adequate liquid seal for drainage holes 38.

Float 45, controlling valve 44, has its lowermost position limited by pins 54. The float 45 carries a hollow sleeve 55, sliding with a relatively close fit in tube 56, which latter passes through plate 22 and is sealed tightly thereto. Hollow sleeve 55 is open at the top and, when the float is in normal operating position, an open port in sleeve 55 corresponds in position, in varying degree, with the connection of conduit 43 into tube 56, thereby permitting the passage of gas from conduit 43 through valve 44 and orifice 46 into chamber 32.

Referring to Figure 3 of the accompanying drawings, this figure is identical with Figure 2 except that float 45 is shown in Figure 3 positioned in a separate chamber 60 which communicates with chamber 23 through liquid connection 61 and gas connection 62. Gas conduit 43 passes outside of chamber 39 on its way to chamber 32. A valve 44 is positioned in gas conduit 43 and is actuated by float 45, acting through linkage 63. In all other respects the individual elements of Figure 3 are identical with the similarly numbered elements of Figure 2, and the operation is identical in the two embodiments.

Figure 4 shows an embodiment of my invention in which the liquid-gas separator with baffles 27 and liquid receiving chamber 23 is in one columnar shell provided with oil inlet line 16, separated oil withdrawal line 42, and return line 50 with pressure actuated valve 51. In this modification a float 45 is positioned in a separate chamber 60, communicating with chamber 23 through liquid line 61 and gas line 62. Gas conduit 43 extends from the top of gas separating chamber 24 into a demisting or precipitating zone which includes drainage chamber 32, packed chamber 33, and head 34. Packing 35 is positioned between gratings 36 and 37. This chamber is made of such size as is dictated by the needs of each specific installation and it contains packing corresponding to that described in chambers 35 and 39 of Figure 2. Line 49, controlled by valve 57, departs from head 34 at a point remote from the point at which line 43 enters drainage chamber 32. Conduit 43, in which valve 44 is interposed, conducts gas from chamber 24 to the demisting chamber and valve 44 is controlled by float 45 acting through linkage 63. Precipitated hydrocarbons from the mist precipitating chamber drain through drainage chamber 32, line 53, valve 52 and finally into line 50 for return to the casing head in the same manner as described in connection with Figure 2. In order to prevent the unrestricted passage of gas from line 43 into line 53 through drainage chamber 32, a liqiud seal or trap 64 is placed in conduit 53, this trap being sealed by the precipitated hydrocarbons draining from the lower section 32 of the mist precipitating chamber. This sealing is equivalent to that attained by the previously described maintenance of liquid in the lower part of chamber 25 of Figure 2.

Figure 5 is a view showing the internal construction of valve 52. The housing of the valve is indicated by numeral 52 and a buoyant sphere by numeral 82. If liquid should back up from line 50 and enter line 53 it will raise buoyant sphere 82 against seat 83, as shown, and prevent any flow therebeyond. In the lower part of housing 52 are several vanes 84 to prevent the sphere seating against the lower outlet of housing 52, and the normal position of sphere 82 will be resting on vanes 84 as indicated by dotted circle 85. In this normal position of the valve gas can pass in either direction but liquid can pass only downward.

In the operation of my apparatus as illustrated in Figures 1 and 2, oil issuing from well tubing head 15 together with its accompanying gas flows, under the pressure of the well pump, through conduit 16 to the gas separating device 21 positioned at a level somewhat above the tubing head. This difference in elevation need be no more than enough to permit gravity flow of condensate through conduits 53 and oil through 50 back into casing head 13. The incoming stream is directed through line 41 into a gas-separating zone 24 fitted with baffles 27. These baffles assist the separation of gas and light vapors from the oil and any accompanying water. Quite commonly a substantial amount of oily mist will be suspended in the separated gas and travel with it. The separated oil and accompanying water falls from the baffles into liquid receiving chamber 23 in the base of enclosing shell 21, and this separated oil flows out of the device through conduit 42 to a receiving tank. The transfer of separated oil through conduit 42 to a receiving tank is advantageously accomplished by maintaining enough pressure in liquid receiving chamber 23 to cause the oil to flow through conduit 42 and into a receiving tank, which required pressure will seldom exceed fifteen or twenty pounds per square inch above atmospheric.

In starting up this equipment after a well has been shut down there will initially be no superatmospheric pressure in liquid receiving chamber 23, and the building up of enough pressure to cause the oil to flow from chamber 23 to a receiving tank is accomplished as follows. Float 45 is initially resting in its lowest position, on pins 54, and valve 44 is open. The incoming oil, not being under enough pressure to flow into the receiving tank accumulates in chamber 23 and the rise of liquid level therein continues until the rising float 45 fully closes valve 44 and shuts off the escape of separated gas. The continuing accumulation of both oil and gas in the apparatus under the pressure of the well pump causes a continuing increase of pressure in chambers 23 and 24 and conduit 43 until the pressure is adequate to effect a flow of separated oil out of the apparatus through conduit 42 to a receiving tank. A continuing accumulation of gas in receiving chamber 23 and gas separating zone 24 causes a lowering of the oil level in liquid receiving chamber 23, which in turn effects a lowering of float 45 and a gradual opening of gas valve 44, with consequent passage of gas therebeyond. From that point on, if the production of oil and gas are uneven the float may have frequent and substantial motion, with frequent opening and closing of valve 44, but if the rates of flow of gas and oil are reasonably uniform the liquid level in chamber 23 and the degree of opening of valve 44 will attain an equilibrium and remain relatively stationary. In constructing the apparatus which I have invented I choose such dimensions of chamber 23, chamber 24 and line 43 as will give the maximum desired internal pressure without permitting the separated oil to rise above plate 22.

In the operation of equipment it is always possible that some inexperienced or careless operator will become confused and shut down a valve that should be kept open, possibly on oil discharge conduit 42, or that conduit 42 might otherwise become blocked, and against that contingency I provide a return line 50, controlled by pressure operated valve 51. Valve 51 is set to open at a pressure slightly higher than that necessary to force oil from liquid receiving chamber 23 to a receiving tank, and any oil discharged from chamber 23 through conduit 50 is recirculated back to casing head 13, at which point it goes into the annular space between casing 11 and tubing 12, down around the bottom of the tubing, and is repumped up through tubing 12 by the well pump at the bottom of the tubing. The pump, not shown in the accompanying drawings, is operated in the conventional manner by means of rod 18 from a gas engine at ground level. The just described feature of my system is particularly valuable in that a receiving tank can be fitted with an automatic shut-off valve on the charging line to prevent overfilling, and upon closing of the shut-off valve the oil will automatcially and harmlessly recirculate until directed into another receptacle.

After passing valve 44 the gas traverses the precipitating section of the apparatus and is finally discharged through connection 49 which leads to a point of use. Obviously the gas pressure throughout the precipitating section will be lower than the pressure existing in liquid receiving chamber 23, baffle chamber 24, and line 43, the exact pressure depending upon the degree of constriction imposed by valve 57 on discharge connection 49 and by back pressure on line 53.

The gas which has passed valve 44 is discharged through opening 46 into an upper portion of drainage chamber 32. It then passes upwardly through zone 33 which is packed with a permeable material which may advantageously be lathe turnings of brass or of some other material not too strongly affected by the gas. Passage of the gas through packed chamber 33 of the primary precipitating zone effects precipitation of a very substantial portion of the volatile vapors contained in the gas, and also of the oily mist carried along from baffle chamber 24.

The mist and light vapors which are precipitated in packed chamber 33 of the primary precipitating zone drain down into drainage chamber 32, immediately therebelow, and this liquid then drains out through a few small apertures 38 in the base of side walls 30 and flows into the bottom of secondary precipitating zone 39. Liquid drain 53 from zone 39 is placed somewhat above the bottom thereof to maintain a liquid seal on apertures 38 and prevent free passage of gas therethrough. The resistance to gas flow created by the metal turnings in chamber 33 is low and therefore the liquid seal around apertures 38 may be shallow. The partially stripped gas passes from the primary precipitating zone through head 34 and conduit 47 into the secondary precipitating zone 39 at a point remote from gas discharge connection 49.

The horizontal cross section of the enclosing shell 21 may be either circular or rectangular and chambers 24 and 33 may likewise be either circular or rectangular in horizontal cross section. In any case enclosing shell 21 is made large enough to provide a substantial secondary precipitating zone 39 around the outside of chambers 24 and 32, 33 and 34, and this secondary precipitating zone 39 is packed with permeable material, advantageously somewhat less coarse than metal turnings. Coiled glass fiber has proven to be a highly satisfactory material for this purpose.

As previously described, the gas entering the secondary precipitating chamber 39 is further stripped of its volatile vapors and mist in traveling through the permeable material from entrance point 48 to gas discharge connection 49. The material stripped from the gas is of course precipitated as liquid, and it settles to the bottom of chamber 39 and drains out through conduit 53, past valve 52, into return conduit 50 and flows therethrough back into casing head 13 and the annular space between casing 11 and tubing 12. As previously described for oil returning through line 50, the precipitated liquid from zones 32, 33, and 39 descends through the annular space between casing and tubing to the bottom of the tubing and is there again picked up by the well pump operated by rod 18 and once more pumped through tubing 12, conduit 16, separating chamber 24, receiving chamber 23, and line 42 to a receiving tank. This recycling of the precipitated hydrocarbons without any bleeding of light hydrocarbons from the cycle does not build up an excessive proportion of light ends in the system because this system is principally adapted to use with a well which produces a very small proportion of volatile material and further because the precipitated mist is primarily not a volatile material but rather is heavier hydrocarbon which has been converted into mist by mechanical action.

It should be pointed out that valve 52 in line 53 is a check valve which permits gas to flow past freely in either direction but lets liquids flow only from chamber 39 to conduit 50. It is conveniently constructed with a bouyant plastic sphere in a cage. By closing against upward flow of liquid it prevents any oil leaving chamber 23 past pressure operated valve 51 from invading chamber 39 and gas line 49.

The equipment and mode of operation here described, and which constitute my invention, are especially advantageous for use with wells which make only a limited amount of gas and which require that gas to operate the engine which pumps the well. In such situations a device and operation such as here described permits operation of the well in conventional manner and operation of the pumping engine on the modest available supply of gas without the cost of laying expensive gas lines to distant points to obtain fuel for the gas engine, the latter often entailing the purchase of such gas from others. A particularly advantageous feature of the system is that the annular space between casing 11 and tubing 12 is filled with gas and in conjunction with conduits 50 and 53, serves as a gas accumulator, providing an adequate supply of available gas for starting up the engine after the well has been shut down. These advantages are of the greatest benefit and economy and particularly in the common instance where wells of low gas productivity are remote from wells with more generous gas productivity.

The embodiment of my invention shown in Figure 3 has the float 45 positioned exteriorly to chamber 23 but the manner of operation of this embodiment is identical with that of Figure 2.

The manner of operation of the embodiment of my invention shown in Figure 4 is identical with that of Figures 2 and 3.

I claim:

1. In combination with an oil well comprising an outer casing and an inner tubing, the said casing and tubing being in open communication at a low point in said well, a casing-head fitted with a connection to the annular space between casing and tubing, and a tubing-head fitted with a connection to the interior of the tubing, the improvement in gas and oil separators which comprises an enclosing shell; a liquid receiving chamber in the lower portion of said shell; a gas separating zone in the upper portion of said shell; baffles in the said gas separating space; an inlet connection for introducing the well production into the enclosing shell in the vicinity of the said baffles; a mist precipitating chamber packed with a mass of permeable material; a conduit extending from the said gas separating space to the said mist precipitating chamber, and a valve in said conduit; a float in the liquid receiving chamber, and a linkage extending therefrom to close the said valve with increasing depth of liquid in the liquid receiving chamber and to open the said valve with decreasing depth of liquid in the liquid receiving chamber; a separated-oil outlet connection from a low point in the liquid receiving chamber; a second separated-oil outlet connection; a return conduit leading from said second separated-oil outlet to the casing-head connection into the annular space between the well casing and the well tubing, and an excess-pressure relief valve positioned in said return conduit; a separated-gas outlet connection from the mist precipitating chamber; a conduit extending from a low point of the mist precipitating chamber to the said return conduit at a point on said return conduit between the excess-pressure relief valve and the casing-head, and a float-operated check valve in this conduit to permit the passage of gas in either direction between the mist precipitating chamber and the return conduit while permitting the passage of liquid therethrough only from the mist precipitating chamber to the return conduit.

2. In combination with an oil well comprising an outer casing and an inner tubing, the said casing and tubing being in open communication at a low point in said well; a casing-head fitted with a connection to the annular space between casing and tubing; and a tubing-head fitted with a connection to the interior of the tubing; the improvement in gas and oil separators which comprises an enclosing shell; a liquid receiving chamber in the lower portion of said shell; a gas separating zone in the upper portion of said shell; baffles in the said gas separating space; an inlet connection for introducing the well production into the enclosing shell in the vicinity of the said baffles; a mist precipitating chamber packed with a mass of permeable material; a conduit extending from the said gas separating space to the said mist precipitating chamber, and a valve in said conduit; a float in the liquid receiving chamber, and a linkage extending therefrom to close the said valve with increasing depth of liquid in the liquid receiving chamber and to open the said valve with decreasing depth of liquid in the liquid receving chamber; a separated-oil outlet connection from a low point in the liquid receiving chamber; a second separated-oil outlet connection; a return conduit leading from said second separated-oil outlet to the casing-head; an excess-pressure relief valve positioned in said return conduit, set to open at a predetermined excess pressure; a separated-gas outlet connection from the mist precipitating chamber; a conduit extending from a low point of the mist precipitating chamber to the said return conduit at a point on said return conduit between the excess-pressure relief valve and the casing head, and a float-operated check valve in this conduit to permit the passage of gas in either direction between the mist precipitating chamber and the return conduit while permitting the passage of liquid therethrough only from the mist precipitating chamber to the return conduit.

3. In combination with an oil well comprising an outer casing and an inner tubing, the said casing and tubing being in open communication at a low point in said well, a casing head connecting with the annular space between casing and tubing, and a tubing head connecting with the interior of the tubing, the improvement in gas and oil separators which comprises: a well-fluid receiving chamber adapted to permit gravity separation of the oil and the gas constituting the said well-fluid; an inlet connection for introducing well fluid into the said receiving chamber; an outlet conection from a low point in the well-fluid receiving chamber adapted to permit the removal of separated oil therefrom; a mist precipitating chamber adapted to precipitate mist particles from a flowing stream of gas; a conduit extending from a high point in the well-fluid receiving chamber to the said mist precipitating chamber, and a valve in said conduit; a float in the well-fluid receiving chamber, and a linkage extending therefrom to close the said valve with increasing depth of liquid in the well-fluid receiving chamber and to open the said valve with decreasing depth of liquid in the well-fluid receiving chamber; an excess-pressure relief valve mounted on the well-fluid receiving chamber, and a conduit connecting from the said excess-pressure relief valve to the casing head; a separated-gas outlet connection from the mist precipitating chamber; a conduit connecting from a low point of the mist precipitating chamber into the said conduit connecting from the excess-pressure relief valve to the casing head, and a float-operated check valve in the first mentioned of these two conduits adapted to permit the passage of gas in either direction therethrough while permitting the passage of liquid therethrough only from the mist precipitating chamber toward the casing head.

4. In combination with an oil well comprising an outer casing and an inner tubing, the said casing and tubing being in open communication at a low point in said well, a casing head connecting with the annular space between casing and tubing, and a tubing head connecting with the interior of the tubing, the improvement in gas and oil separators which comprises: a well-fluid receiving chamber adapted to permit gravity separation of the oil and the gas constituting the said well-fluid; an inlet connection for introducing well fluid into the said receiving chamber; an outlet connection from a low point in the well-fluid receiving chamber adapted to permit the removal of separated oil therefrom; a mist precipitating chamber adapted to precipitate mist particles from a flowing stream of gas; a conduit extending from a high point in the well-fluid receiving chamber to the said mist precipitating chamber, and a valve in said conduit; a liquid-level detecting device in communication with the well-fluid receiving chamber, adapted to detect the level of liquid in said chamber, and a linkage extending therefrom to close the said valve with increasing depth of liquid in the well-fluid receiving chamber and to open the said valve with decreasing depth of liquid in the well-fluid receiving chamber; an excess-pressure relief valve mounted on the well-fluid receiving chamber, and a conduit connecting from the said excess-pressure relief valve to the casing head; a separated-gas outlet connection from the mist precipitating chamber; a conduit connecting from a low point of the mist precipitating chamber into the said conduit connecting from the excess-pressure relief valve to the casing head, and a check valve in the first mentioned of these two conduits adapted to permit the passage of gas in either direction therethrough while permitting the passage of liquid therethrough only from the mist precipitating chamber toward the casing head.

References Cited in the file of this patent

UNITED STATES PATENTS

| | | |
|---|---|---|
| 2,104,327 | Kotzebue | Jan. 4, 1938 |
| 2,229,538 | Zublin | Jan. 21, 1941 |
| 2,319,702 | Moon | May 18, 1943 |
| 2,682,278 | English | June 29, 1954 |
| 2,698,055 | Williams | Dec. 28, 1954 |